T. F. WEBSTER.
PIVOTED GATE FOR SKIP HOISTS.
APPLICATION FILED APR. 10, 1918.
1,359,212.
Patented Nov. 16, 1920.
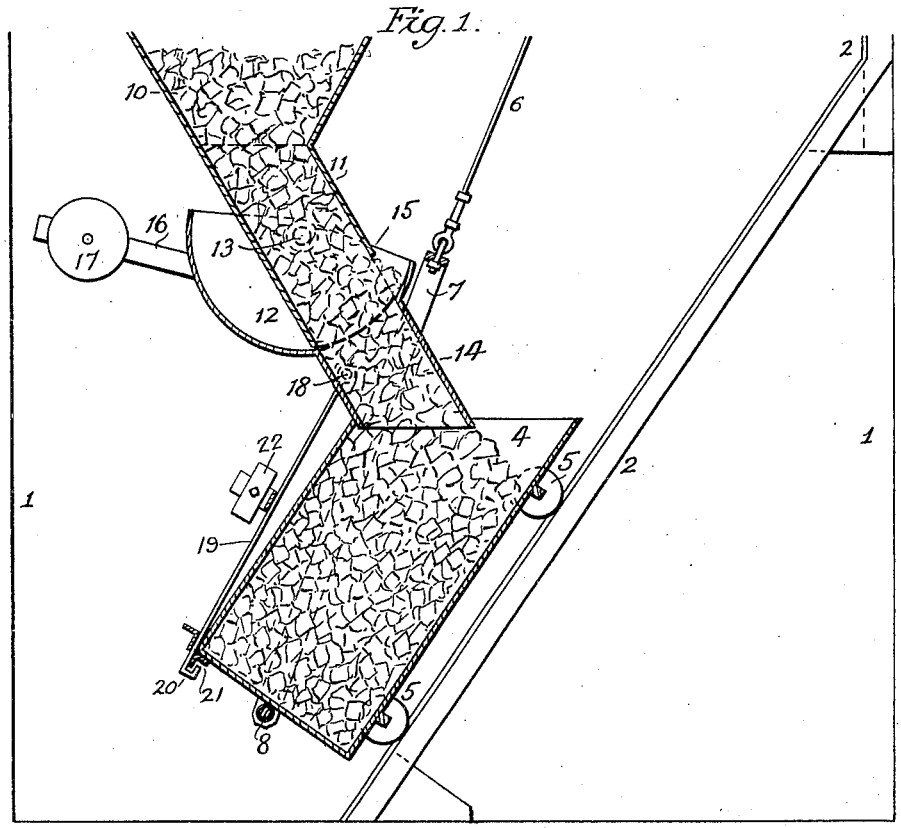
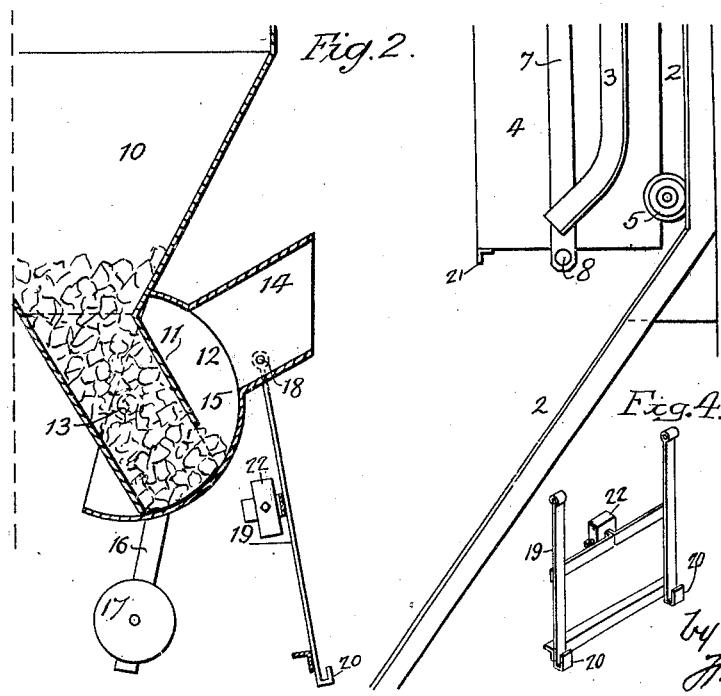
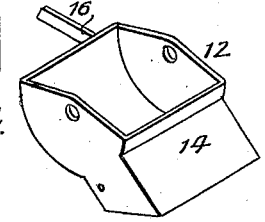
Inventor:
Thomas F. Webster,
by his Attorneys
Howson & Howson

UNITED STATES PATENT OFFICE.

THOMAS F. WEBSTER, OF PHILADELPHIA, PENNSYLVANIA, ASSIGNOR TO R. H. BEAUMONT COMPANY, OF PHILADELPHIA, PENNSYLVANIA, A CORPORATION OF PENNSYLVANIA.

PIVOTED GATE FOR SKIP-HOISTS.

1,359,212.          Specification of Letters Patent.     Patented Nov. 16, 1920.

Application filed April 10, 1918. Serial No. 227,696.

*To all whom it may concern:*

Be it known that I, THOMAS F. WEBSTER, a citizen of the United States, residing in Philadelphia, Pennsylvania, have invented certain Improvements in Pivoted Gates for Skip-Hoists, of which the following is a specification.

My invention relates to certain improvements in gates for controlling the flow of material from a hopper into a bucket of a skip hoist, or similar apparatus.

One object of my invention is to provide a gate which will allow the material to flow into the bucket and which will, when the bucket is full, dam up in the bucket and will not overflow and spill into the pit.

A further object of the invention is to provide means for automatically closing the gate when the bucket is raised, and which will automatically move the gate into the open position when the bucket is lowered to a point to receive its load.

In the accompanying drawing:—

Figure 1, is a sectional view of the pit of a skip hoist, showing the bucket in position to be loaded;

Fig. 2, is a view, similar to Fig. 1, with the loaded bucket being lifted and the gate turned to the closed position;

Fig. 3, is a perspective view of my improved gate; and

Fig. 4, is a perspective view of the hook, which is connected to the gate and through which the bucket is turned to the loading position.

1 is the pit of a skip hoist. 2 and 3 are the guiding rails for the bucket, which may be vertical or inclined, as desired. The lower end of the rail 2 is arranged diagonally and supports the bucket 4 in its lowest position while receiving its load. The bucket, in the present instance, is of the type illustrated in the drawing and is open at the top to receive the material to be lifted. On the bucket are the usual wheels 5 which travel on the track 2. 6 is the hoisting rope connected to a bail 7, pivoted at 8 to the bottom of the bucket. This hoisting rope passes around a suitable guide roller to the top of the skip hoist and from there to any suitable hoisting apparatus.

10 is a hopper located so as to receive material from a car, or other carrier, on the surface, and this hopper has an inclined chute 11. The lower end of this chute is curved to conform with the curve of the pivoted gate 12. This gate is pivoted to the chute at 13 and can swing from the position illustrated in Fig. 1 to that illustrated in Fig. 2. The gate has a chute 14 which is in alinement with the chute 11 when the gate is in its lowest position and open, and this gate is closed on all four sides, but is open at the lower end and is so proportioned that it will extend over the open end of the bucket 4, as clearly illustrated in Fig. 1. The gate preferably extends above the upper edge of the chute 11 when in the position illustrated in Fig. 1 and the top plate 15 of this chute is terminated some distance from the edge so as to prevent the jamming of the granular material in the chute when the gate is turned up by the action of the bucket.

I preferably secure an arm 16 to the bucket and this arm projects at the rear and is provided with a counterweight 17 which can be adjusted to any position desired on the arm, so as to balance the gate and allow it to turn more readily on its pivot.

Pivotally connected at 18 to the chute 14 is a swinging hook 19, in the present instance having two arms with hooked ends 20 which are arranged to engage a flange 21 on the bucket when the bucket is being lowered to the loading position, so as to turn the gate 12 on its pivot to the position illustrated in Fig. 1. The hook is preferably provided with an adjustable weight 22 to project the hook more or less into the path of the bucket.

The operation is as follows:—If ashes, or or other granular material, are to be loaded in the bucket, the ashes are discharged into the hopper 10 and if the gate is in the position illustrated in Fig. 1 the ashes will flow into the bucket until they reach the mouth of the chute 14, which forms part of the gate. Then the flow of the material will be stopped and the ashes will accumulate in the hopper 10. The hoisting apparatus is then set in motion and the bucket is raised and in its upward movement engages the extended chute 14 of the gate and moves the gate from the position illustrated in Fig. 1 to that illustrated in Fig. 2, bringing the solid portion of the gate in front of the end of the chute 11 and preventing the escape of material from said chute. When the bucket reaches a given level it is automatically discharged in the ordinary manner and is returned to the filling position. As it returns the hooked guide rod 19 engages the flange 21 on the bottom of the bucket and shifts the gate from the position illustrated in Fig. 2 to that illustrated in Fig. 1, the material flowing from the hopper through the chutes into the bucket until the bucket is filled, when the flow will automatically stop and the above operation can be repeated.

I claim:—

1. The combination in a skip hoist, of a bucket; means for raising and lowering the bucket; a chute; and a pivoted valve having a chute extension arranged to project over the open end of the bucket when the bucket is in position to receive a load, the extension of the valve acting to stop the flow of material from the chute when the bucket is filled.

2. The combination in a skip hoist, of a bucket; means for raising and lowering the bucket; a chute; a valve arranged to cut off the flow of material from the chute and having a chute extension arranged to project over the open end of the bucket when the bucket is in position to receive a load, said extension being closed at the top and acting to stop the flow of material from the chute when the bucket is filled.

In witness whereof I affix my signature.

THOMAS F. WEBSTER.